United States Patent [19]

Kuroda et al.

[11] Patent Number: 4,978,473

[45] Date of Patent: Dec. 18, 1990

[54] POLYMERIC SOLID ELECTROLYTE

[75] Inventors: Nobuyuki Kuroda; Hiroshi Kobayashi, both of Yokohama; Kazuo Matsuura, Tokyo, all of Japan

[73] Assignee: Nippon Oil Co., Ltd., Tokyo, Japan

[21] Appl. No.: 354,374

[22] Filed: May 19, 1989

[30] Foreign Application Priority Data

Jun. 2, 1988 [JP] Japan ................................ 63-134457

[51] Int. Cl.$^5$ .............................................. H01B 1/06
[52] U.S. Cl. .................................... 252/500; 252/518; 252/62.2; 429/192; 429/213
[58] Field of Search ...................... 252/500, 518, 62.2; 429/191, 192, 213

[56] References Cited

U.S. PATENT DOCUMENTS 4,442,187  4/1984  MacDiarmid et al. ............. 429/213
4,609,600  9/1986  Heinze et al. ....................... 429/213

*Primary Examiner*—Josephine Barr
*Attorney, Agent, or Firm*—Oblon, Spivak, McClelland, Maier & Neustadt

[57] ABSTRACT

The present invention relates to a polymeric solid electrolyte which comprises a network molecule formed by polymerizing a polyethylene glycol with acrylic or methacrylic groups at both ends, and containing therein (a) a specific acrylate-type copolymer, (b) a low molecular polyethylene glycol with both ends methyl-esterified, and (c) an alkali metal salt or ammonium salt. The polymeric solid electrolyte of the present invention has an ionic conductivity of $10^{-5}$ S/cm or higher at room temperature, is strong in film strength even with a thickness of 100 μm or less, and is superb in adherence to electrodes.

8 Claims, 1 Drawing Sheet

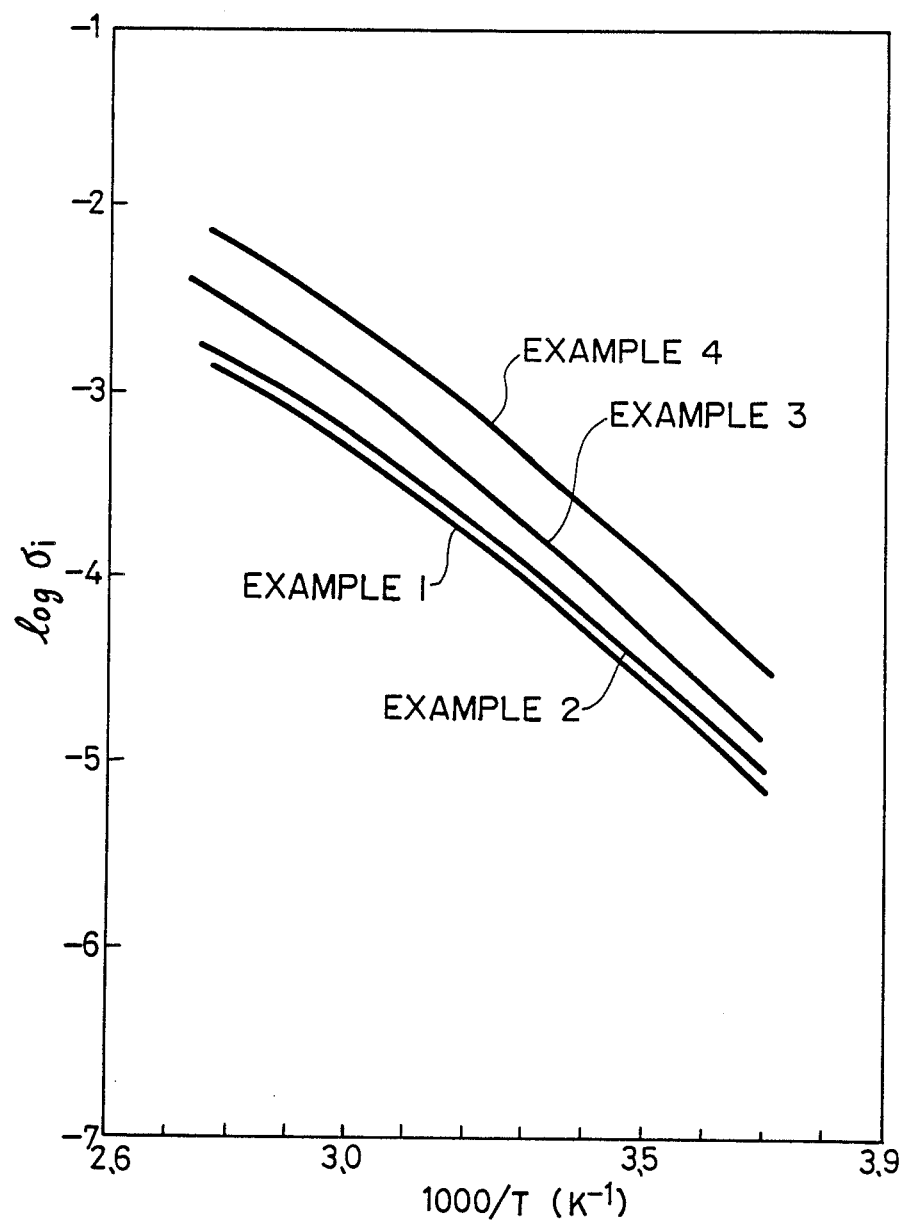

POLYMERIC SOLID ELECTROLYTE

BACKGROUND OF THE INVENTION a. Field of the Invention

This invention relates to an ionic conductive polymer or a polymeric solid electrolyte.

b. Description of the Prior Art

There have recently been developed solid electrolytes of organic polymers which have such advantages that (1) they are easier to mold and also to make thin films of large areas and (2) they are more flexible and more excellent in adherence to electrodes than inorganic solid electrolytes.

As a polymeric solid electrolyte, M.B. Armand et al. proposed a mixture of polyethylene oxide and a salt of alkali metal salts (Fast Ion Transport in Solids, 131, 1979). However, the conductivity of the solid electrolyte is less than $10^{-6}$ S/cm at room temperature, the strength of its thin films being weak, and its adherence to electrodes is not satisfactory. Hence, its improvement has been desired.

In order to increase the film strength, there have been proposed a method of crosslinking by the reaction of a trifunctional polyethylene glycol and a diisocyanate derivative (Japanese Patent Laid-Open No. 48716/1987), a method of crosslinking to form network molecules by the polymerization of polyethylene glycol diacrylate (Japanese Patent Laid-Open No. 285954/1987), and other methods. However, further improvements have been desired in the balance of properties such as film strength, ionic conductivity and adherence to electrodes.

SUMMARY OF THE INVENTION

The object of the present invention is to provide a polymeric solid electrolyte which has an ionic conductivity of $10^{-5}$ S/cm or higher at room temperature, is strong in film strength even with a thickness of 100 μm or less, and is superb in adherence to electrodes.

The above object can be achieved by providing a polymeric solid electrolyte which comprises a network molecule formed by polymerizing a polyethylene glycol having acrylic or methacrylic groups at both ends and containing therein a copolymer illustrated in (a) below, (b) a low molecular polyethylene glycol with both ends methyl-etherified, and (c) an alkali metal salt or ammonium salt:

(a) a copolymer of a compound represented by the following general formula (I) and a compound represented by the following general formulae (II) and/or (III),

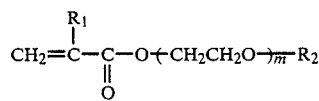
  (I)

wherein $R_1$ is hydrogen or an alkyl group with a carbon number of 1-5, $R_2$ is an alkyl group with a carbon number of 1-5, and m is an integer of $2<m<30$,

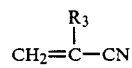
  (II)

wherein $R_3$ is hydrogen or an alkyl group with a carbon number of 1-3, and

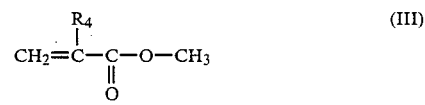
  (III)

wherein $R_4$ is hydrogen or an alkyl group with a carbon number of 1-3.

BRIEF DESCRIPTION OF THE DRAWING

FIG. 1 shows the relationship between the temperature and ionic conductivity of solid polyelectrolytes obtained in Examples 1-4.

DESCRIPTION OF THE PREFERRED EMBODIMENTS

In the present invention, the network molecule containing the components (a) to (c) is a molecule formed by the polymerization and crosslinking of a polyethylene glycol having at both ends acrylic or methacrylic groups capable of vinyl polymerization (hereinafter referred to as polyethylene glycol diacrylate). The polyethylene glycol diacrylate used may preferably have an oxyethylene unit of 4-30, with a unit of 6-25 being more preferred.

The compound represented by the general formula (I) and useful in the practice of the present invention is a polyether-type macromer of the formula (I), wherein the oxyethylene unit m is in the range of $2<m<30$, preferably in the range of $4<m<25$, $R_1$ is preferably hydrogen or methyl, $R_2$ is preferably methyl or ethyl.

The compound represented by the general formula (II) and useful in the practice of the present invention includes acrylonitrile, methacrylonitrile, α-ethylacrylonitrile, α-isopropylacrylonitrile and the like. Of these, acrylonitrile and methacrylonitrile are preferred.

The compound represented by the general formula (III) and useful in the practice of the present invention includes methyl acrylate, methyl methacrylate methyl α-ethyl acrylate, methyl α-isopropyl acrylate, methyl α-n-butyl acrylate and the like. Of these, methyl acrylate and methyl methacrylate are preferred.

The copolymer (a) can be obtained by the copolymerization of a compound represented by the general formula (I) and a compound represented by the general formulae (II) and/or (III) in the presence of a conventional radical polymerization initiator.

If the content of the structure originated from the compound of the general formula (I) is too large in the molecule of the copolymer (a), the strength of the resulting polymeric solid electrolyte film tends to be degraded. If it is too small on the other hand, the ionic conductivity of the polymeric solid electrolyte film tends to be reduced. Consequently, the content may preferably be in the range of 20-80 mol % in the molecule, with a content of 40-60 mol % being particularly preferred.

The mean molecular weight of the copolymer (a) may preferably be in the range of 5,000-200,000, particularly in the range of 10,000-100,000.

The low molecular polyethylene glycol (b) useful in the practice of the present invention is one with its both ends methyl-etherified, the mean molecular weight of which lies preferably in the range of 200-3,000, particularly in the range of 300-2,000.

The alkali metal salt to be used as the component (c) in the present invention may include lithium perchlorate, sodium perchlorate, potassium perchlorate, lithium tetralluoroborate, sodium tetrafluoroborate, potassium tetrafluoroborate, lithium hexafluorophosphate, potassium hexafluorophosphate, lithium trifluoroacetate, lithium trifluoromethanesulfonate and the like.

The ammonium salt to be used as the component (c) in the present invention may include tetra-isopropylammonium perchlorate, tetra-n-butylammonium perchlorate, tetra-n-butylammonium tetrafluoroborate, tetra-n-butylammonium hexafluorophosphate, tetra-n-butylammonium trifluoromethanesulfonate and the like.

The proportion of the copolymer (a) to the low molecular polyethylene glycol (b) by weight may preferably be in the range of (a):(b)=1:0.1–1:10, particularly in the range of (a):(b)=1:0.5–1:5.

The amount of the polyethylene glycol diacrylate used to form the network molecule may preferably be in the range of 10–200 parts by weight, more preferably in the range of 30–100 parts by weight, based on 100 parts by weight of the total of the copolymer (a) and the low molecular polyethylene glycol (b).

The amount of the alkali metal salt or ammonium salt (c) may preferably be in the range of 1–30 parts by weight, particularly in the range of 3–20 parts by weight, based on 100 parts by weight of the total of the copolymer (a), the low molecular polyethylene glycol (b) and the polyethylene glycol diacrylate.

No particular limitations are imposed on the process for producing the polymeric solid electrolyte of the present invention. The following process may be used by way of example.

The process comprises polymerizing the polyethylene glycol diacrylate in the presence of the copolymer (a), the low molecular polyethylene glycol (b) and the alkali metal salt of ammonium salt (c) to form a network molecule, thereby producing the polymeric solid electrolyte of the present invention.

The process will be illustrated more specifically hereinbelow. The above components (a) to (c), polyethylene glycol diacrylate, and a photopolymerization initiator such as 2-hydroxy-2-methylpropiophenone (1–2% by weight) are dissolved in a solvent such as acetone, ethanol and tetrahydrofuran to form a homogeneous solution. The solution is then allowed to flow and spread over a substrate. Thereafter, the solvent is removed substantially and the resulting film is cured by the irradiation of ultraviolet rays or by the application of heat to obtain the polymeric solid electrolyte of the present invention.

As an alternative process, the reactants may be submitted to cast polymerization in the presence of a radical polymerization initiator such as azobisisobutyronitrile to obtain the polymeric solid electrolyte.

No particular restrictions are placed on the shape of the polyxeric solid electrolyte of the present invention. It may be formed into various shapes in accordance with its uses. However, it is especially useful in the present invention to form it into a film. Its thickness may preferably range from 1 $\mu$m to 1000 $\mu$m, particularly from 5 $\mu$m to 300 $\mu$m.

The presence of the copolymer (a) is indispensable in the present invention. If the copolymer (a) is not present, strong films can not be obtained due to poor film formability. The addition of the copolymer (a) will result in significantly improved film formability and also improved ionic conductivity. Thus, strong polymeric solid electrolyte films that have conductivities of $10^{-5}$–$10^{-3}$ S/cm at room temperature and good adherences to electrodes can surprisingly be obtained.

The polymeric solid electrolyte of the present invention, having the aforementioned effects, is widely applicable as an ionics device to the total solidification of lithium cells and plastic cells and the electrolytes for electrochromic display.

The present invention will be described more specifically by reference to the following examples. However, the present invention shall not be limited to or by these examples.

EXAMPLE 1

A radical copolymerization of polyethylene glycol monomethacrylate (number of C-C-O units: 9) and acrylonitrile was conducted in toluene solvent in the presence of azobisisobutyronitrile as an initiator. The composition of the copolymer can be altered by the feed ratio upon the polymerization. In this example, a copolymer consisting of 48.3 mol % of the structure originated from the polyethylene glycol monomethacrylate and 51.7 mol % of the structure originated from the acrylonitrile and having a mean molecular weight of 47,000 was synthesized for subsequent use.

In 10 ml of acetone were dissolved 1 g of said copolymer, 1 g of polyethylene glycol dimethacrylate (number of C-C-O units: 23), 1 g of polyethylene glycol dimethyl ether (number of C-C-O units: 8) and 158 mg (8 wt. %) of lithium perchlorate. The solution was added with a small amount of azobisisobutyronitrile and stirred sufficiently. Thereafter, the resulting solution was subjected to polymerization at 60° C. on a Teflon schale in an atmosphere of nitrogen while evaporating acetone, whereby a transparent and strong polymeric solid electrolyte film with a thickness of 55 $\mu$m was obtained. After the film had been dried fully at 70° C. by means of a vacuum drier, its conductivity was measured according to the complex impedance method. It was found to be $8.0 \times 10^{-5}$ S/cm at 25° C., as shown in FIG. 1.

COMPARATIVE EXAMPLE 1

A polymeric solid electrolyte was synthesized in the system not containing the copolymer in Example 1, i.e., a system consisting of 1 g of polyethylene glycol dimethacrylate (number of C-C-O units: 23), 1 g of polyethylene glycol dimethyl ether (number of C-C-O units: 8) and 174 mg (8 wt. %) of lithium perchlorate. The polymeric solid electrolyte was a very fragile film and its ionic conductivity was $2.1 \times 10^{-5}$ S/cm.

EXAMPLE 2

In 10 ml of acetone were dissolved 1 g of the copolymer of Example 1, 1 g of polyethylene glycol dimethacrylate (number of C-C-O units: 23), 2 g of polyethylene glycol dimethyl ether (number of C-C-O units: 8) and 210 mg (8 wt. %) of lithium perchlorate. The solution was added with a small amount of azobisisobutyronitrile and stirred sufficiently. Thereafter, the resulting solution was subjected to polymerization at 60° C. on a Teflon schale in an atmosphere of nitrogen while evaporating acetone, whereby a transparent solid polyelectrolyte with a thickness of 78 $\mu$m was obtained. After the film had been dried fully at 70° C. by means of a vacuum drier, its conductivity was measured according to the complex impedance method. It was found to be $9.2 \times 10^{-5}$ S/cm at 25° C., as shown in FIG. 1.

COMPARATIVE EXAMPLE 2

When the synthesis was conducted in the system not containing the copolymer in Example 2, i.e., a system consisting of 1 g of polyethylene glycol dimethacrylate (number of C-C-O units: 23), 2 g of polyethylene glycol dimethyl ether (number of C-C-O units: 8), and 261 mg (8 wt. %) of lithium perchlorate, the product was not solidified but was a viscous liquid.

EXAMPLE 3

A radical copolymerization of polyethylene glycol monomethacrylate (number of C-C-O units: 9) and methyl methacrylate was conducted in toluene solvent in the presence of azobisisobutyronitrile as an initiator. The composition of the copolymer can be altered by the feed ratio upon the polymerization. In this example, a copolymer consisting of 51.6 mol % of the structure originated from the polyethylene glycol monomethacrylate and 48.4 mol % of the structure originated from the methyl methacrylate and having a mean molecular weight of 58,000 was synthesized for subsequent use.

In 10 ml of acetone were dissolved 1 g of said copolymer, 1 g of polyethylene glycol dimethacrylate (number of C-C-O units: 23), 2 g of polyethylene glycol dimethyl ether (number of C-C-O units: 8) and 348 mg (8 wt. %) of lithium perchlorate. The solution was added with a small amount of azobisisobutyronitrile and stirred sufficiently. Thereafter, the resulting solution was subjected to polymerization at 60° C. on a Teflon schale in an atmosphere of nitrogen while evaporating acetone, whereby a transparent polimeric solid electrolyte with a thickness of 90 μm was obtained. After the film had been dried fully at 70° C. by means of a vacuum drier, its conductivity was measured according to the complex impedance method. It was found to be $1.4 \times 10^{-4}$ S/cm at 25° C., as shown in FIG. 1.

EXAMPLE 4

In 10 ml of acetone were dissolved 1 g of the copolymer of Example 3, 1 g of polyethylene glycol dimethacrylate (number of C-C-O units: 23), 3 g of polyethylene glycol dimethyl ether (number of C-C-O units: 8) and 435 mg (8 wt. %) of lithium perchlorate. The solution was added with a small amount of azobisisobutyronitrile and stirred sufficiently. Thereafter, the resulting solution was subjected to polymerization at 60° C. on a Teflon schale in an atmosphere of nitrogen while evaporating acetone, whereby a transparent polymeric solid electrolyte with a thickness of 85 μm was obtained. After the film had been dried fully at 70° C. by means of a vacuum drier, its conductivity was measured according to the complex impedance method. It was found to be $3.4 \times 10^{-4}$ S/cm at 25° C., as shown in FIG. 1.

We claim:

1. A polymeric solid electrolyte which comprises a network molecule formed by polymerizing a polyethylene glycol which has acrylic or methacrylic groups at both ends and an oxyethylene unit of 4-30, wherein the network molecule contains therein (a) a copolymer, whose mean molecular weight is in the range of 5,000-200,000, formed by copolymerizing a compound represented by the following general formula (I) with a compound represented by at least one of the following general formulas (II) and (III),

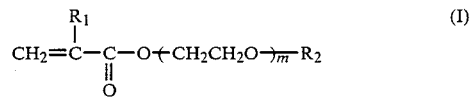

wherein $R_1$ is hydrogen or an alkyl group with a carbon number of 1-5, $R_2$ is an alkyl group with a carbon number of 1-5, and m is an integer of $2 \leq m \leq 30$,

wherein $R_3$ is hydrogen or an alkyl group with a carbon number of 1-3, and

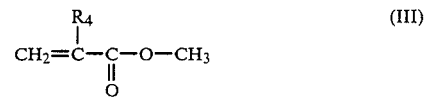

wherein $R_4$ is hydrogen or an alkyl group with a carbon number of 1-3, (b) a low molecular polyethylene glycol with both ends methyl-etherified, and (c) an alkali metal salt or ammonium salt;

the ratio by weight of the copolymer (a) to the low molecular polyethylene glycol (b) is in the range of 1:0.1-1:10, the amount of the polyethylene glycol with acrylic or methacrylic groups at both ends is in the range of 10-200 parts by weight based on 100 parts by weight of the total of the copolymer (a) and the low molecular polyethylene glycol (b), and the amount of the alkali metal salt or ammonium salt (c) is in the range of 1-30 parts by weight based on 100 parts by weight of the total of the copolymer (a), the low molecular polyethylene glycol (b) and the polyethylene glycol with acrylic or methacrylic groups at both ends.

2. The polymeric solid electrolyte according to claim 1 in the form of a of film.

3. The polymeric solid electrolyte according to claim 1 wherein the compound represented by the general formula (II) is one or more compounds selected from the group consisting of acrylonitrile, methacrylonitrile, α-ethylacrylonitrile and α-isopropylacrylonitrile.

4. The polymeric solid electrolyte according to claim 1 wherein the compound represented by the general formula (III) is one or more compounds selected from the group consisting of methyl acrylate, methyl methacrylate, methyl α-ethyl acrylate, methyl α-isopropyl acrylate and methyl α-n-butyl acrylate.

5. The polymeric solid electrolyte according to claim 1 wherein the content of the structure originated from the compound of the general formula (I) in the molecule of the copolymer (a) is in the range of 20-80 mol %.

6. The polymeric solid electrolyte according to claim 1 wherein the mean molecular weight of the low molecular polyethylene glycol (b) is in the range of 200-3,000.

7. The polymeric solid electrolyte according to claim 1 wherein the alkali metal salt used as the component (c) is one or more salts selected from the group consisting of lithium perchlorate, sodium perchlorate, potassium perchlorate, lithium tetrafluoroborate, sodium tetrafluoroborate, potassium tetra-fluorobrate, lithium hexafluorophosphate, potassium hexafluorophosphate, lithium trifluoroacetate and lithium trifluoromethanesulfonate.

8. The polymeric solid electrolyte according to claim 1 wherein the ammonium salt used as the component (c) is one or more salts selected from the group consisting of tetra-isopropylammonium perchlorate, tetra-n-butylammonium perchlorate, tetra-n-butylammonium tetrafluoroborate, tetra-n-butylammonium hexafluorophospahte and tetra-n-butylammonium trifluoromethanesulfonate.

* * * * *